(12) United States Patent
Aher et al.

(10) Patent No.: US 11,800,203 B2
(45) Date of Patent: Oct. 24, 2023

(54) SYSTEM AND METHODS TO DETERMINE USER INTEREST IN UNRESOLVED PLOT OF A SERIES AND RESOLVING IT

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/861,552

(22) Filed: Jul. 11, 2022

(65) Prior Publication Data

US 2023/0019203 A1  Jan. 19, 2023

Related U.S. Application Data

(63) Continuation of application No. 17/374,079, filed on Jul. 13, 2021, now Pat. No. 11,418,859.

(51) Int. Cl.
*H04N 21/8549* (2011.01)
*H04N 21/6587* (2011.01)
*H04N 21/442* (2011.01)
*H04N 21/472* (2011.01)

(52) U.S. Cl.
CPC ... *H04N 21/8549* (2013.01); *H04N 21/44204* (2013.01); *H04N 21/44226* (2020.08); *H04N 21/47217* (2013.01); *H04N 21/6587* (2013.01)

(58) Field of Classification Search
CPC ......... H04N 21/8549; H04N 21/44204; H04N 21/44226; H04N 21/47217; H04N 21/6587
See application file for complete search history.

(56) References Cited

U.S. PATENT DOCUMENTS

| | | | |
|---|---|---|---|
| 10,555,023 B1 | 2/2020 | McCarthy et al. | |
| 11,418,859 B1* | 8/2022 | Aher ................ | H04N 21/44226 |
| 2007/0101369 A1 | 5/2007 | Dolph | |
| 2014/0270700 A1 | 9/2014 | Dhanasarnsombat et al. | |
| 2016/0173941 A1 | 6/2016 | Gilson et al. | |
| 2017/0280208 A1* | 9/2017 | Mishra ................ | G06V 10/764 |
| 2017/0339450 A1* | 11/2017 | Cowburn ......... | H04N 21/23412 |
| 2019/0075374 A1 | 3/2019 | Panchaksharaiah et al. | |
| 2020/0068274 A1* | 2/2020 | Aher .................. | H04N 21/4825 |
| 2020/0177971 A1 | 6/2020 | Puniyani et al. | |
| 2021/0314675 A1 | 10/2021 | Wang | |

* cited by examiner

*Primary Examiner* — John R Schnurr
(74) *Attorney, Agent, or Firm* — Haley Guiliano LLP (57) ABSTRACT

The present disclosure relates to systems and methods for resolving an unresolved plot or storyline of a series and resolving it. A user may not view all episodes in a series of episodes, particularly if the series runs over a long period of time, such as several years. The user may however be interested and curious to know how the series ends, with reference to a storyline that runs throughout the series. Therefore the disclosure provides methods and systems for determining if a user is interested in the resolution of an unresolved storyline and generating a resolution video for display.

20 Claims, 6 Drawing Sheets

SYSTEM AND METHODS TO DETERMINE USER INTEREST IN UNRESOLVED PLOT OF A SERIES AND RESOLVING IT

CROSS-REFERENCE TO RELATED APPLICATION

This application is a continuation of U.S. patent application Ser. No. 17/374,079, filed Jul. 13, 2021, which is hereby incorporated by reference herein in its entireties.

FIELD

The present disclosure relates to systems and methods for determining user interest in an unresolved plot or storyline of a series and resolving it. A user may not view all episodes in a series of episodes, particularly if the series runs over a long period of time, such as several years. The user may however be interested and curious to know how the series ends, with reference to a storyline that runs throughout the series. Therefore the disclosure provides methods and systems for determining if a user is interested in the resolution of an unresolved storyline and generating a resolution video for display.

BACKGROUND

Many program series have a format of running a main background plot over multiple seasons, while each episode has its own separate plot. The program series makers keep the viewers engaged in the background plot by slowly revealing its details in some episodes over various seasons, and finally the background plot is resolved in some episode/s towards end of the last season of the series. There could be many viewers who watched the series only for initial seasons and later discontinued watching it. Such viewers who invested their interest in background plot in those initial seasons may like to get a resolution for the same even though they have discontinued watching the series.

Many series, comprising several seasons, from 3 to 25 seasons spread over a year to several years, include a background plot that will run over the entire series. Such series are also referred to as "box-sets", since they can be bought as a box of DVDs containing all episodes of all seasons of the series. "Box-set" has become a term for a series spanning several seasons each containing multiple episodes, even though most are now purchased online and downloaded as a whole series, or watched on demand, rather than acquired as a physical box of DVDs.

A series or box set will have a storyline thread running throughout the entirety of the series, usually concluding fairly dramatically at the end of the final episode. The conclusion may be a solution to a riddle or puzzle that has been vexing characters (and viewers) throughout every episode in every season of the series. The conclusion may be what happens to the main characters in the end, which may not be dramatic, but usually results in a feeling of tying up the series, such as the main character ending up with the job of their dreams that they have been seeking as a side-line through the series, or the main character turning over a new leaf after numerous failed attempts. Each episode tends to have an individual plot or storyline and each season has an overarching plot/storyline, which may be resolved fairly dramatically.

Essentially, the viewer will gain some satisfaction from watching one episode, as the plot for that episode will conclude, but the viewer may feel unsatisfied that they do not know the outcome of the season or the whole series background plot. Some viewers will watch a season or two of a series and will gain some satisfaction from each of the episode plots resolving, and each of the season plots resolving but they may feel some lack of satisfaction from not knowing the ultimate outcome of the whole series, despite having seen some of the clues throughout the first two seasons. However, their curiosity may not be enough to watch the remaining seasons, or they may no longer be able to watch the series due to other time commitments, etc.

It is relatively easy, once a series has concluded, to find out the conclusion in simple terms, for example, who was the mystery murderer. Such conclusions are often discussed extensively on social media, with or without so-called "spoiler alerts", notifying the user that the conclusion to the series is contained within the content being consumed, e.g., a magazine article, an Instagram post or a YouTube video. The user who has an interest in the series but viewed it incompletely may wish to know the conclusion but may also wish to know how it was resolved, and not only, e.g., the name of the murderer. Alternatively, the user may intentionally find out the conclusion, and then be left wondering how it was resolved, particularly if they are surprised at the conclusion.

The user may simply watch all episodes that they had previously not watched, or even watch the whole series (box-set) from start to finish, once their interest has been piqued. However, if time commitments or other reasons existed that prevented the user from watching the streaming episodes as they were available, it is unlikely that the user will have time to watch all episodes once the conclusion has been revealed.

Therefore, there is a need to provide resolution of a series storyline to a user for an incompletely viewed series. Accordingly, the present disclosure provides a method to resolve an unresolved storyline of a series of episodes incompletely viewed by the user. Such a series of episodes will have a storyline that runs throughout the series. A plurality of episodes having a reference to the storyline is determined, and at least one episode of the plurality of episodes that has not been viewed by the user is determined. A resolution video is generated, which includes at least part of at least one episode that is unviewed by the user. The resolution video is then made available to the user to view.

The proportion of episodes having a reference to the storyline that have been viewed by the user, in relation to the number of episodes of the series having a reference to the storyline may be determined. A threshold number/percentage of episodes may be set, and if the user has viewed fewer than the threshold number of episodes (or a lower percentage than the threshold percentage), a greater number of at least part of episodes may be included in the resolution video, such that the user is reminded about the viewed storyline. If the user has watched more than the threshold number of episodes (or higher than the threshold percentage of episodes), fewer or none of the viewed episodes are included in the resolution video as the user will have a more solid understanding or a greater knowledge of the storyline.

The interest of the user may be determined prior to generating the video, such that it is more likely that the user will watch the resolution video. The interest of the user may be determined by evaluating the user's interaction with at least one episode having a reference to the storyline. For example, the user may "like" an episode, either through indicating a like via a media set-top box or via a post on Instagram, Facebook or the like. The user may comment on the episode, on the media device or via social media, as above. The user may rewind and re-view the episode, or part of the episode that contains a reference to the storyline, indicating an interest in the storyline. The user may bookmark the episode for ease of reference, or place on a list of favorite episodes/series. On the contrary, the user may fast-forward through some of the episode, or comment negatively on it. The user may delete it from a bookmarked or a favorites list. Such interaction can be used to determine whether a user has an interest in the series and the storyline. The level of interest may determine whether a resolution video is generated, and it may determine the duration of the resolution video, and it may determine the options that are presented to the user when the resolution video is generated and made accessible to the user.

The resolution video may comprise multiple parts of a plurality of episodes of a series, which have a reference to the storyline, identified by meta-data associated with each episode. Particularly if the user has not viewed many episodes, the resulting video may be very long, i.e., significantly longer than the average episode in the series. The resolution video may be adjusted in duration such that it is about the same duration as an average episode in the series, so as to retain the user's interest. The resolution video may comprise scenes within episodes that have a reference to the storyline that runs throughout the series. Accordingly, scenes having a reference to the storyline within episodes of the series may be identified. In particular, unviewed scenes, or scenes within unviewed episodes may be identified. The resolution video may be generated using the scenes identified as having a reference to the storyline. The resolution video may include an introductory section, which may introduce each of the main characters in the storyline. The resolution video may start with a scene from the episode immediately subsequent to the last episode viewed by the user. The resolution video may concatenate scenes from different episodes. The concatenation may link scenes having a reference to the storyline in the order in which they are shown when viewing the series episode by episode in sequential order, or the scenes may be concatenated in such a way that each character's part in the storyline is shown sequentially, meaning the scenes are shown in a different order than they would have been viewed had the user viewed the episodes in the series as broadcast or as intended.

Particular scenes or parts of an episode may be identified as being more relevant than others to the storyline. The relevance to the storyline may be scored with reference to a threshold such that scenes or parts of episodes are identified that include information important or critical to the ultimate conclusion of the storyline, and others may be identified that are of interest but they may be skipped such that the storyline and/or conclusion thereof still makes sense.

The resolution video may include a "recap" or introduction or refresher at the beginning. The recap may be a concatenation of short excerpts of the episodes already viewed by the user. The recap or introduction may be a trailer for the series that was prepared and displayed prior to the broadcast of the series, as an advertisement for the series before and during its broadcast. The resolution video may comprise a conclusion. The conclusion may comprise all scenes having a reference to the storyline from the final episode. The conclusion may include the penultimate episode. The conclusion may include parts of the final 2, 3, 4, or 5 episodes. The resolution video may alternatively be a short reveal of the conclusion, e.g., the ill-fated couple get married, the murderer is Mrs. Jones, the reason the trickster acted was because he was tricked in the past, the main suspect is innocent and the fraudster is the detective, etc.

The resolution video may comprise several sections that may be able to be viewed together or viewed separately. For example, a resolution video may be generated that comprises: one or more parts of one or more episodes that have been viewed by the user; one or more parts of one or more episodes that are unviewed by the user; a conclusion that may include one or more parts of one or more final (1, 2, 3, 4 or 5) episodes. The user may choose whether to watch all sections spliced together as one video or to select which sections to view such as just a recap of the viewed episodes and the conclusion, or just the unviewed episodes and the conclusion. Or the viewer with not much time may choose to just view the conclusion without watching any of the parts of episodes that lead to the conclusion.

For example, a user may view several episodes in season 1 of "The Mentalist", a TV series that has a background plot to identify a serial killer known as Red John. Some details about the killer and other references to them are given out in some of the episodes of the first 5 seasons of the series. The storyline runs over 151 episodes over seven seasons. The Red John storyline is concluded in season 6, revealing the identity of Red John. The remainder of the episodes in the series have separate storylines.

The user viewed episodes 1 to 15, 17-20 and 23 in season 1. The user also viewed episodes 1 to 15, 17-19, 22-23 of season 2; episodes 1-10, 13-18, 21-24 of season 3; and episodes 3, 6, 7, 10, 14, 15, 19, 21 of season 4. The user viewed the first 5 episodes of season 5 and did not view any further episodes. It is determined from the episodes viewed that the user is interested in the storyline running through the series of "The Mentalist", despite not having watched most of series 5, or any of seasons 6 and 7. The user viewed 74 of a possible total of 151 episodes, which is a little under half of all episodes. The threshold in this instance is set to 30%, such that, should 30% of episodes be viewed, it is determined that the user has an interest in the series.

The user in this case also was active on social media at the times of viewing the episodes containing reference to Red John. He posted on Facebook his predictions for the next steps in the drama and also shared on Facebook his predictions regarding the identity of Red John. The user "liked" other people's posts about the series. He also followed the official Facebook page of "The Mentalist". The user also interacted with social media relevant to the series, i.e., he opened Facebook posts on "The Mentalist" Facebook page periodically during the whole of season 5 and occasionally during season 6, despite not actively watching the season's episodes.

Therefore, the system determines that the user is interested in the series and the storyline and therefore generates a resolution video for the user to view. The system determines in particular that season 1, episode 7 includes information pertinent to the identity of Red John at minutes 3:44-5:23 and also at 15:12-19:42. The system determines that the user viewed this episode. It also determines that season 3, episode 5 has information that is important to the discovery of the identity of Red John, particularly at minutes 7:34-15:23 and 18:22-20:33. The user viewed this episode. Similarly, in season 5, episode 24, information critical to Red John's identity is revealed during minutes 0:44-4:48. 6:33-12:23 and 14:12-20:42. This episode is unviewed by the user. The season storyline concludes in episode 5 of season 6, with most of the episode being highly relevant but the identity finally being revealed at 35:32-44:02. This season was completely unviewed by the user.

Accordingly, the system generates a resolution video having three sections: the first section comprises the parts of the episodes viewed by the user that have references to the storyline (i.e., the parts of episode 7, season 1 and episode 5 of season 3 highlighted above); the second section comprises the parts of the episodes not viewed by the user that have reference to the storyline (i.e., the parts of episode 24 of season 5 highlighted above); and the third section, the conclusion (the parts of episode 5 of season 6 having the conclusion of the storyline highlighted above). The system generates a notification box for the user, indicating that a resolution video has been prepared. The user has the option of choosing to view all sections of the resolution video, or selecting one or more sections to view.

In one embodiment, the user may select to view all sections, and is glad to have their memory refreshed by re-viewing the parts of the episodes previously viewed in the first section, and pleased to have some more details in the second section before the identity of Red John is revealed in the conclusion section of the resolution video. In another embodiment, the user may not have enough time to view the whole resolution video and therefore may just select the conclusion section.

Because the user is satisfied with their viewing experience, they are more likely to start to view a new series, even if they are unsure if they will be able to view enough episodes to follow the storyline that runs throughout the series, or if they doubt they will retain enough interest to view to the end of the last season. Knowing they can view a resolution video after the series finishes may encourage the user to begin viewing a series they may otherwise decide not to view. This means ads reach a larger audience than if a resolution video was not available, generating larger ad income for the broadcaster and likely a larger income for the advertised product or service.

In another example, a user, Betty begins to watch "CSI: Miami", which was broadcast over 232 episodes over 10 seasons. Betty is impatient to find out what a particular ongoing storyline is and how it progresses, and only views a handful of episodes from each season, and does not view any episodes from season 8 onwards. Th system therefore determines her interest as low, as she has only viewed 15% of all episodes. However, she often visits the "CSI: Miami" website, and has recorded all episodes, but has not viewed any of the recordings. Betty's viewing patterns tend toward "binge-watching". She watches several episodes at a time on demand, e.g., episodes 1-6 back-to-back, and then does not view any for about 6 months at a time. After 8 months have elapsed since Betty last viewed 3 episodes from season 8 of "CSI: Miami", she is prompted by a notification box asking if she would like to view a resolution video for the series. Betty is intrigued and selects "YES". The system then asks how long she would like the resolution video to be, and offers options of 15 minutes, 30 minutes, 45 minutes, an hour or 90 minutes. Betty selects 15 minutes, since, although she often viewed many episodes in one viewing session, she has low interest in CSI: Miami now, but is intrigued enough to want to see the conclusion. Betty selects 15 minutes, and the resolution video is generated having the scenes from the final episode that are most relevant to the conclusion of the series.

Betty feels satisfied after watching the resolution video and is glad she knows what happens to her favorite characters at the end of the series. She feels that, having watched the short resolution video, she wants to know more about what led to the conclusion, and so she views episodes of earlier seasons. Thus, Betty as a user is satisfied, and the program makers generate further advertising revenue, because she views further episodes that she would have been unlikely to view had she not been drawn back in by the offer of the resolution video.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for generating a resolution video of an unresolved storyline and determining user interest in viewing such a video. "Unresolved storyline" means a storyline running through a plurality of episodes of a series to be broadcast on television, either on demand, pay-per-view or on commercial television channels on a predetermined schedule. The series may be broadcast by satellite or cable or it may be a terrestrial broadcast. The series may be long-running over several or many seasons, over a number of years.

The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

A user is any person or people using the computing device. A computing device may implement a system of profiles to help identify between physical users. However, where multiple physical users use the same computing device without a way of identifying each of them (i.e., without different user profiles), the systems and methods described herein may treat the multiple physical users as a single "user".

The steps of identifying an interaction between a user and the series and the generating a resolution video described herein may be integrated into one or more applications. In other examples, they may be provided via an application programming interface (API) and, for example, a remote server, such that existing applications can call the functionality from within the application.

Figure 1:
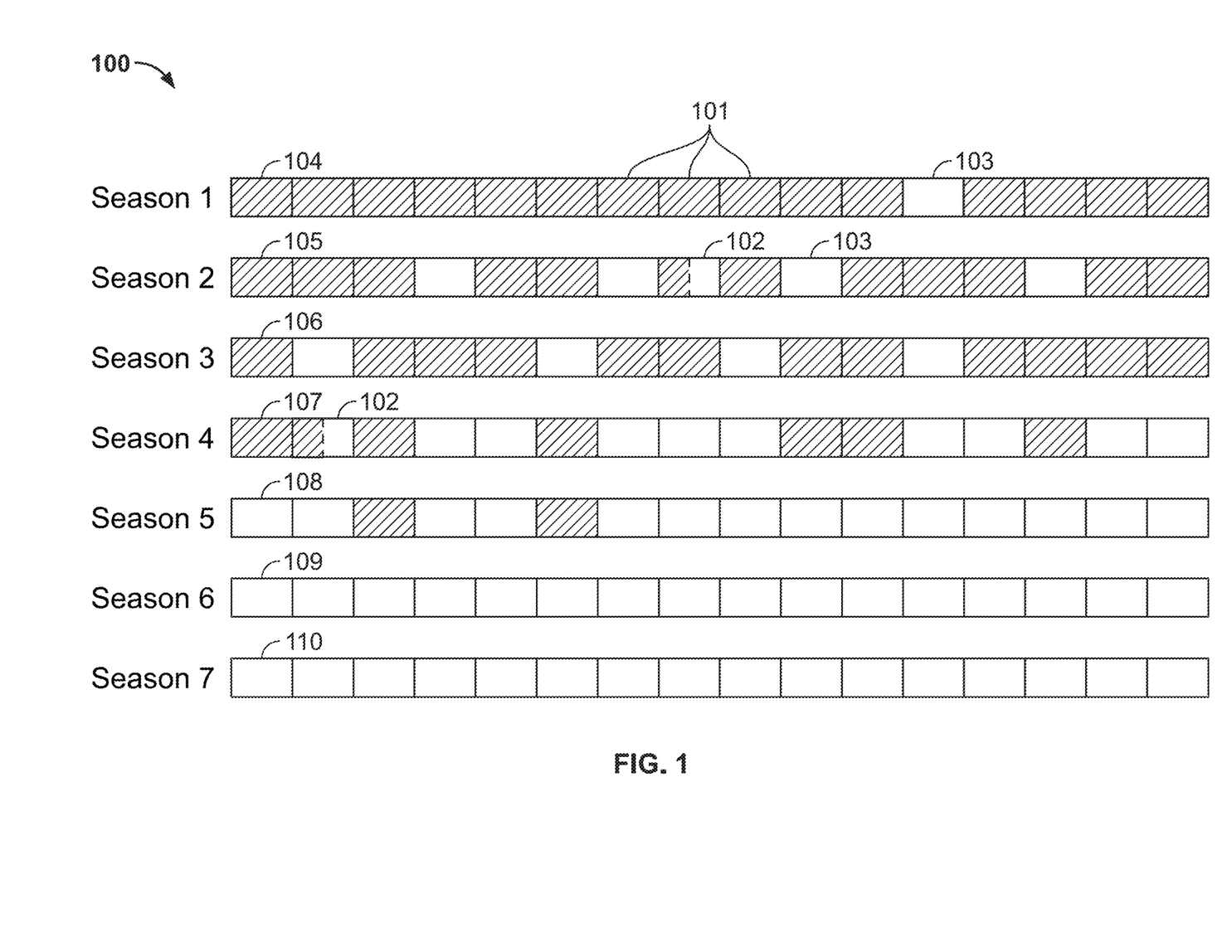
FIG. 1 shows an exemplary representation of a whole series of episodes showing which have parts that are relevant to the storyline and shows the viewing pattern of a typical user who has started to view a series, in accordance with some embodiments of the disclosure.

FIG. 1 shows an exemplary representation of a whole series 100 of episodes 101, 102, 103 and shows the viewing pattern of a user who has started to view the series 100, the shaded areas representing the episodes that have been viewed 101, or partially viewed 102. At 103, an unviewed episode is represented. Seven seasons are shown, 104 to 110. The seasons may each be broadcast over a number of months, with each season beginning and ended at about the same time of year. For example, season 1 may have begun in September 2014 and run until March 2015, with an episode being broadcast at a regular time, once a week. Season 2 may have begun in September 2015 and ended in March 2016, with the same weekly pattern of episode broadcast. This continues on an annual basis until the final season end in March 2021. An example of a series having this broadcasting pattern (although not the same dates) is "The Mentalist". Alternatively, the series may run over a shorter time period, such as six weeks, with episodes being shown daily on every day of the week, or daily from Monday to Friday. The six week period over which the season runs may occur again for the nest season on an annual basis, or it may occur twice a year, or three times a year. For the represented series 100, the user viewed nearly all episodes, 101, of season 1, shown at 104. For season 2, at 105, the user viewed most episodes but left more unviewed than in season 1, at 104. In season 3, at 106, the viewer does not view about 30% of the episodes 101 in the season and partially views two of the episodes, at 102. In season 4, at 107, the user views about a third of the episodes, and in season 5, at 108, they view only two episodes of the series 100 in that season. In seasons 6 and 7, at 109 and 110 respectively, the user does not view any episodes, which therefore remain unviewed, 103.

In this scenario, the user appears to have been invested in the storyline of the series 100 for about 3 or 4 seasons (104 to 107) and their interest waned (or perhaps time constraints prevented them from viewing) during seasons 5, 6 and 7, at 108 to 110. However, due to their interest in the first few seasons, the user may have an interest in how the series 100 concludes, particularly in relation to the storyline that runs through all seasons, 104 to 110, of the series 100.

Figure 2:
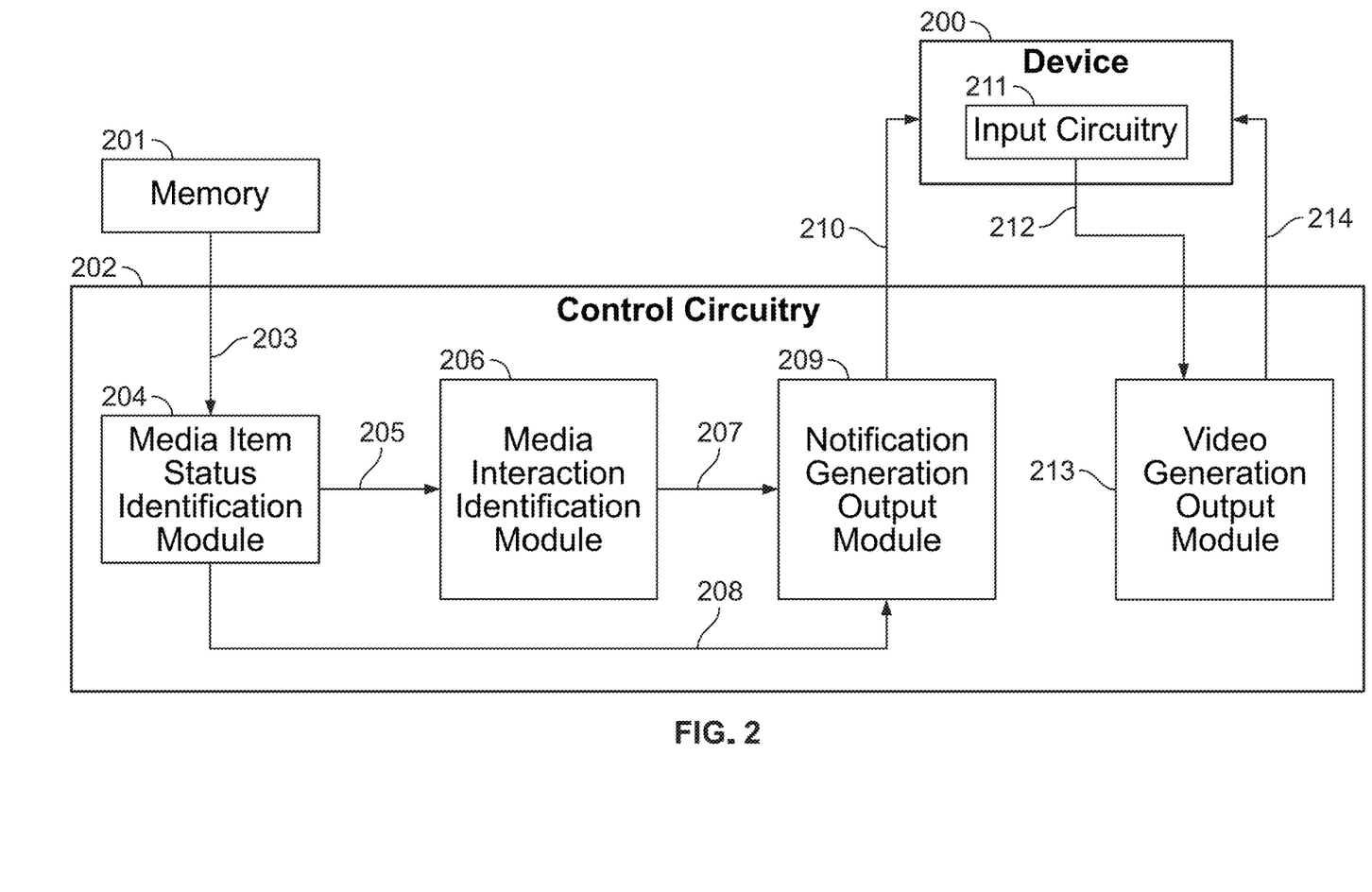
FIG. 2 is a block diagram showing components and data flow therebetween of a system for generating a resolution video and determining a user's interest therein, in accordance with some embodiments of the disclosure.

FIG. 2 is a block diagram showing components and data flow therebetween of a system for generating a resolution video and determining a user's interest therein, in accordance with some embodiments of the disclosure FIG. 2 shows a device 200 on which a user may have viewed an episode 101 of a series 104, as described in FIG. 1. The device 200 may be any suitable for displaying a media item, such as a video. When a series 100 has concluded and reached the end of its final season, memory 201 communicates to the control circuitry 202 via signal 203. The memory may be a media database, which may be connected to the control circuitry. The connection may be a network connection such as an Ethernet port, WiFi module, or any other data connection suitable for communicating with a remote server. As referred to herein, control circuitry 202 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

The control circuitry receives 203 the signal to a media item status identification module 204, which identifies the series 100 and determines whether at least one episode 101 has been viewed by the user. If the viewer has not viewed at least one episode 101, information (contained in meta-data) that the series 100 has concluded is ignored and a resolution video is not generated by the control circuitry 202. If the media item status identification module 204 determines that fewer than a predetermined threshold number of episodes have been viewed by the user, it will send a signal 205 to a media interaction identification module 206, which determines whether a user has interacted with the series 100. The interaction may be interaction with the display 200 screen with which the user interacts in order to display an episode 101. An interaction may be wherein one or more episodes 101 are marked as favorites, or rewound or re-viewed, or bookmarked. The interaction may be recording one or more episodes or recording the whole series 100 or one or more seasons 104-110 thereof.

In some embodiments, the interaction may be separate from or in addition to an interaction with the display 200 screen and may be by way of social media, such as Facebook, Instagram, Twitter or the like. Therefore, the media interaction identification module 206 may determine, via a connection (not shown), whether the user has interacted with social media posts relating to the series. The connection may be a network connection such as an Ethernet port, WiFi module, or any other data connection suitable for communicating with a remote server. The media interaction identification module 206 may determine whether the interactions by the user are positive with regard to the series 100 or at least one episode 101 thereof. For example, it may determine positive comments and continued conversation about the storyline, and identify phrases such as "I can't wait to find out who it is!" or "I think I've solved it—I wonder if I'm right." Such text within an interaction would be examples of instances where the user is interested in resolving the storyline.

If the media interaction identification module 206 determines that the user has interacted positively with the series 100, or at least one episode 101 thereof, it sends a signal 207 to a notification generation output module 209 to produce an output 210, which is a notification to the user, which displays on the device 200.

If the media item status identification module 204 determines that more than the threshold number of episodes having reference to the storyline have been viewed by the user, it may instead send a signal 208 directly to the notification generation output module 209, to produce as an output 210, the notification to the user to display on the device 200. The output 210 notifies the user that the series has concluded and asks whether the user would like to view a resolution video.

The user answers the question by way of providing an input that is received by the input circuitry 211. The input circuitry is configured to receive a user input related to a computing device. For example, this may be via a touchscreen, keyboard, mouse, microphone and/or infrared controller of the device. The input circuitry transmits 212 the user input to the video generation output module 213 of the control circuitry 202.

If the user input is to select YES, or any other way of indicating they would like to view the video, the input circuitry sends a signal 212 to the video generation output module 213 to generate the resolution video. The video generation output module 213 sends the video signal 214 to the device 200 such that the device 200 displays the video. If the user selects NO, or otherwise indicates they do not wish to view the video, no output 214 is generated by the video generation output module 213. This may be achieved by the input circuitry 211 not sending a signal 212 to the video generation output module 213, or by the input circuitry sending a signal 212 to the video generation output module 213 to not generate an output 214.

Figure 3:
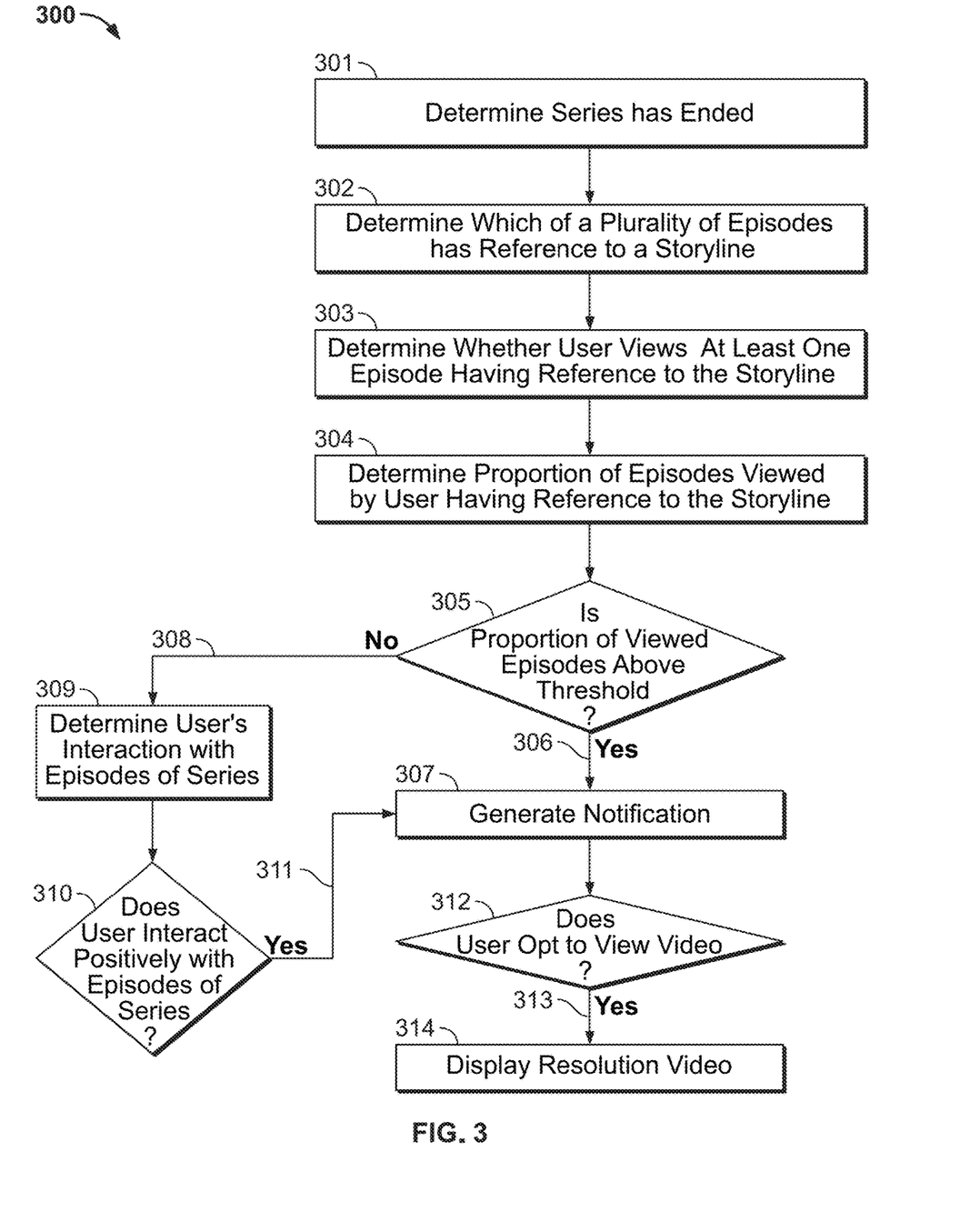
FIG. 3 is a flowchart representing an illustrative process for generating a resolution video and determining a user's interest therein, in accordance with some embodiments of the disclosure.

FIG. 3 is a flowchart representing an illustrative process 300 for generating a resolution video and determining a user's interest therein, in accordance with some embodiments of the disclosure. At 301, it is determined whether a series 100 has concluded. If so, at 302, the system determines the episodes that have reference to a storyline that runs throughout the series. The storyline may be one relating to a particular character, and following the story of their life or part thereof, or it may be a mystery to be solved. The system then determines whether a user has viewed at least one episode having reference to the storyline, at 303, and then determines the proportion of such episodes viewed by the user, at 304. If the proportion of episodes viewed is higher (YES at 306) than a predetermined threshold, at 305, the system generates a notification at 307, notifying the user that a resolution video is available to view and asks the user if they would like to view it. If, at 305, the proportion of viewed episodes is lower (NO at 308) than the predetermined threshold, the system will determine the user's interaction with one or more episodes of the series, at 309. The determining of the user's interaction may be through the display on the device from which they view the episodes, or through social media or both. If the user interacts positively (YES at 311) with the at least one episode, the system generates a notification, at 307, notifying the user that the video is available to view and asking if they would like to view it. If the user responds YES to the notification, at 313, the resolution video is displayed to the user, at 314.

Figure 4:
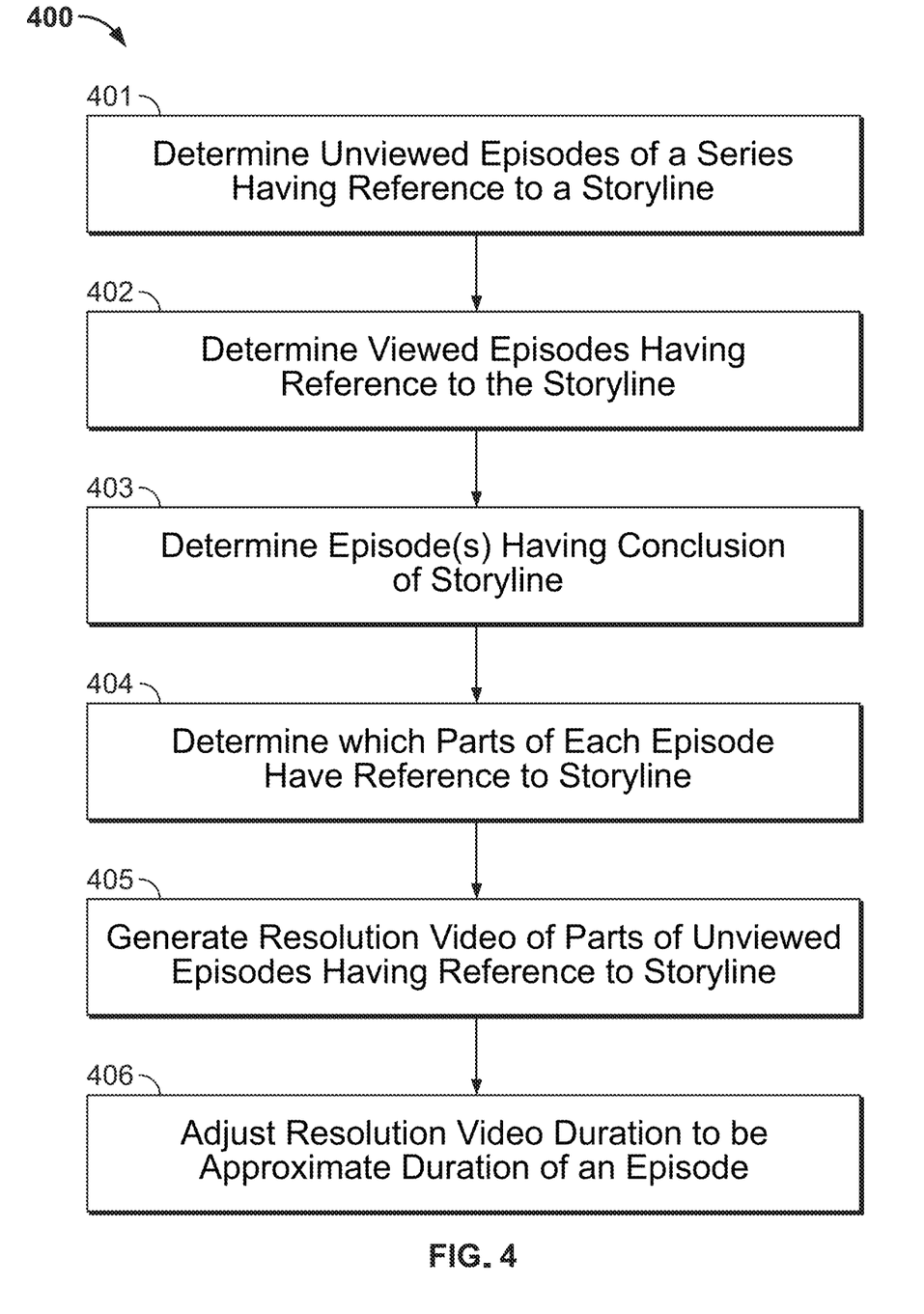
FIG. 4 is a flowchart representing an illustrative process for determining which parts of which episodes to incorporate into a resolution video, in accordance with some embodiments of the disclosure.

FIG. 4 is a flowchart representing an illustrative process 400 for determining which parts of which episodes to incorporate into a resolution video. In each episode 101, 102, 103 of a series 100 (as described in FIG. 1), generally not all of the episode is dedicated to the main storyline that runs throughout the series. Each episode will tend to have its own mini-storyline which is initiated and resolved within that one episode, or perhaps over two episodes. However, many of the episodes, if not all of the episodes, will contain some information relating to the storyline that runs throughout the series. In FIG. 4, the system determines which episodes having a reference to the storyline of a series are unviewed by the user, at 401; which episodes have been viewed by the user, at 402; and which episodes contain the conclusion of the storyline, typically at or near the end of the series 100, at 403.

The system then determines which parts of each episode have reference to the storyline, at 404. The parts may be whole scenes within an episode, or may be just a few moments of an episode. For example, the following information may be determined and identified by the system relating to the episodes unviewed by the user:

S1E7: Background plot timeframes: 3.44-5.23, 15.12-19.42 Background plot referenced. Resolved? No S3E5: Background plot timeframes: 7.34-15.23, 18.22-20.33 Background plot referenced. Resolved? No S6E24: Background plot timeframes: 0.44-4.48, 6.33-12.23, 14.12-20.42 Background plot referenced. Resolved? Yes Accordingly, the resolution video may be generated comprising the identified parts of the identified episodes, at 405. The system will determine the length in time of the resolution video and adjust the duration if necessary, at 406. The duration of the resolution video may be approximately the same duration as an episode of the series to which the video relates. An episode of a series may be about one hour in duration. It may be 30 minutes, 45 minutes, 50 minutes, or 90 minutes in duration. The duration may be shorter than a typical episode, and may only be approximately 10 minutes long.

The duration may be adjusted by removing references to the storyline that are repeated in later episodes, or parts of the storyline that have less impact on the conclusion of the storyline. If the resolution video is longer than an average episode, the system may notify the user and ask if they would like to view a longer video or if they would like a shorter video. The notification may enable the user to select a desired duration of resolution video, such as 15 Minutes, 30 Minutes, 45 minute or an hour.

Figure 5:
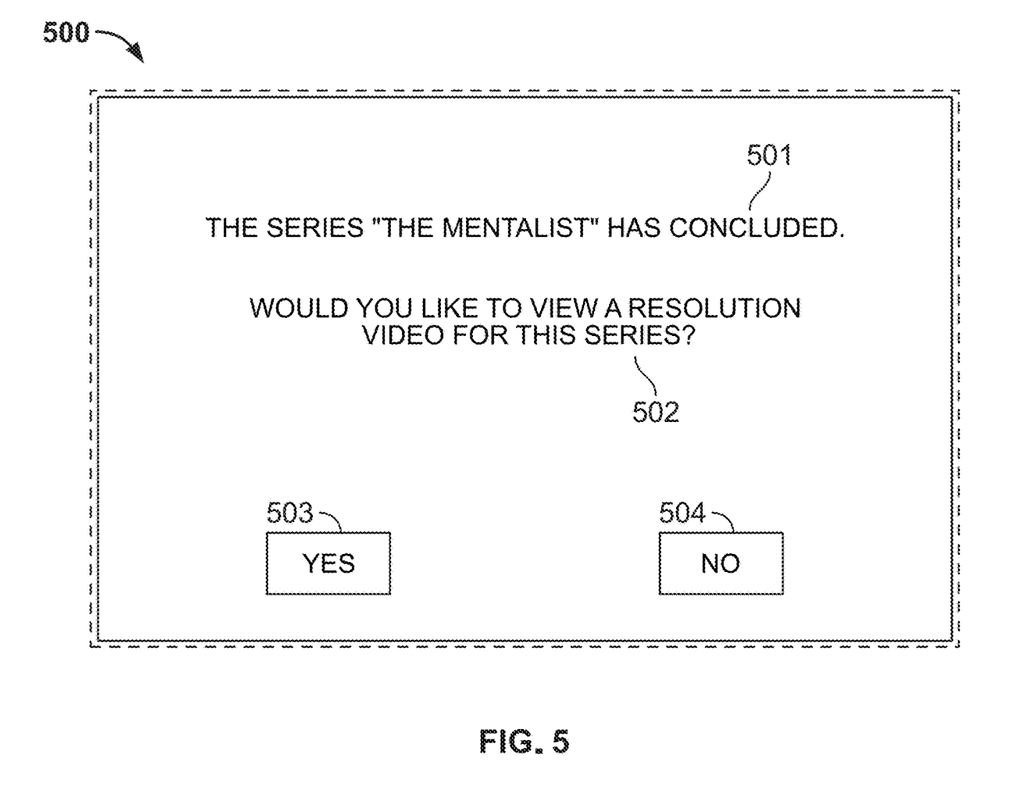
FIG. 5 shows an exemplary notification box, which may appear on the display of a device used to view an episode of a series to notify the user that a resolution video is available, in accordance with some embodiments of the disclosure.

FIG. 5 shows an exemplary notification box 500, which may appear on the display of a device in order to notify the user that a resolution video is available. The notification box 500 may inform the user that the series has ended or concluded 501 and also ask the user if they wish to view a resolution video 502. The notification box 500 may contain two options for selecting an answer, YES 503 and NO 504. For example, the selection may be made via a touchscreen, keyboard, mouse, microphone and/or infrared controller of the device.

Figure 6:
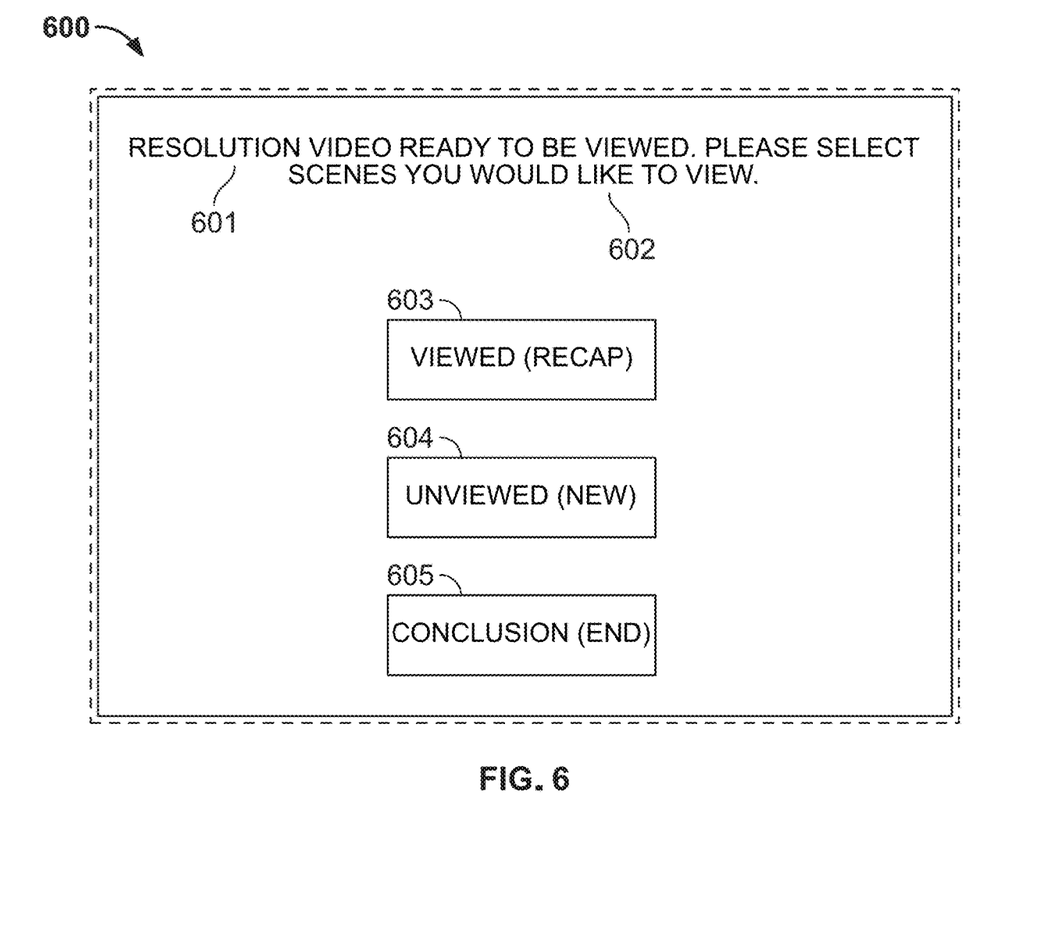
FIG. 6 is an exemplary notification box, which may appear on the display of a device to notify the user that a resolution video is available and to allow the user to choose the composition of the video, in accordance with some embodiments of the disclosure.

FIG. 6 is an exemplary notification box 600, which may appear on the display of a device to notify the user that a resolution video has been generated and is ready to view. The notification box also allows the user to choose the composition of the video. The notification box 600 may contain a statement along the lines of "The resolution video is now ready to be viewed", at 601, followed by a prompt to the user to select what they would like to view in the resolution video, such as "Please select the scenes you would like to view", at 602. The user is given the option of selecting viewed scenes (a recap of what they have already viewed), at 603; unviewed scenes (scenes that are new to them), at 604; and a conclusion (the end of the storyline that runs throughout the series), at 605. The user may use a touchscreen, keyboard, mouse, microphone and/or infrared controller of the device to make their selection.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method to resolve an unresolved storyline of a series of episodes incompletely viewed by a user, wherein the storyline runs throughout the series, the method comprising:
    determining the series has concluded,
    determining a plurality of episodes having a reference to the storyline;
    determining at least one episode of the plurality of episodes having a reference to the storyline that has not been viewed by the user;
    generating a resolution video of at least part of the at least one unviewed episode having a reference to the storyline;
    in response to determining the series has concluded,
    i) making a resolution video available for display; and
    ii) generating for display a notification for the user indicating that the series has concluded.

2. The method of claim 1, further comprising determining the proportion of episodes having a reference to the storyline that have been viewed by the user of all episodes having a reference to the storyline.

3. The method of claim 2, further comprising, if the user has viewed fewer than a predetermined threshold number of episodes having a reference to the storyline, including at least part of one or more of the viewed episodes in the video.

4. The method of claim 1 further comprising, before generating the video, determining the interest of the user in the storyline.

5. The method of claim 4, wherein the interest of the user is determined by evaluating the user's interaction with at least one episode having a reference to the storyline.

6. The method of claim 5, wherein the user's interaction is evaluated based on at least one of the following actions of the user: like, comment, rewind, fast-forward, skip, repeated view, bookmark, placement on favorites list, interaction with or on social media relating to the episode having a reference to the storyline.

7. The method of claim 1 further comprising
    adjusting the duration of the video such that it does not exceed the duration of one episode.

8. The method of claim 1, wherein the generating video comprises at least two sections, the sections optionally being
    1) one or more scenes having the storyline within the episodes that have been viewed by the user;
    2) one or more scenes having the storyline within the episodes not viewed by the user; and/or
    3) one or more scenes having the conclusion of the storyline in the final episode.

9. The method of claim 8, further comprising allowing the user to select which one or more of the at least two sections of the video to view.

10. The method of claim 1, further comprising allowing the user to determine the length of the video.

11. A system for resolving an unresolved storyline of a series of episodes incompletely viewed by a user, wherein the storyline runs throughout the series, the system comprising:
    control circuitry configured to
    determine the series has concluded;
    determine a plurality of episodes having a reference to the storyline;
    determine at least one episode of the plurality of episodes having a reference to the storyline that has not been viewed by the user;
    generate a resolution video of at least part of the at least one unviewed episode having a reference to the storyline; and
    in response to determining the series has concluded,
    i) make a resolution video available for display; and
    ii) generate for display a notification for the user indicating that the series has concluded.

12. The system of claim 11, wherein the control circuitry is further configured to determine the proportion of episodes having a reference to the storyline that have been viewed by the user of all episodes having a reference to the storyline.

13. The system of claim 12, wherein the control circuitry is further configured to, based on the user viewing fewer than a predetermined threshold number of episodes having a reference to the storyline, include at least part of one or more of a viewed episode in the video.

14. The system of claim 11, wherein the control circuitry is further configured to, before generating the video, determine the interest of the user in the storyline.

15. The system of claim 14, wherein the control circuitry is further configured to determine the interest of the user by evaluating the user's interaction with at least one episode having a reference to the storyline.

16. The system of claim 15, wherein the control circuitry is further configured to evaluate the user's interaction based on at least one of the following actions of the user: like, comment, rewind, fast-forward, skip, repeated view, bookmark, placement on favorites list, interaction with or on social media relating to the episode having a reference to the storyline.

17. The system of claim 11, wherein the control circuitry is further configured to
    adjust the duration of the video such that it does not exceed the duration of one episode.

18. The system of claim 11, wherein the control circuitry is further configured to generate a video comprising at least two sections, the sections optionally being
    1) one or more scenes having the storyline within the episodes that have been viewed by the user;
    2) one or more scenes having the storyline within the episodes not viewed by the user; and/or 3) one or more scenes having the conclusion of the storyline in the final episode.

19. The system of claim 18, wherein the control circuitry is further configured to allow the user to select which one or more of the at least two sections of the video to view.

20. The system of claim 11, wherein the control circuitry is further configured to allow the user to determine the length of the video.

\* \* \* \* \*